United States Patent
Ellison

(10) Patent No.: US 8,711,223 B2
(45) Date of Patent: Apr. 29, 2014

(54) VEHICLE-MOUNTED CAMERA STABILIZED PASSIVELY BY VIBRATION ISOLATORS

(75) Inventor: Bruce Ellison, Lake Oswego, OR (US)

(73) Assignee: FLIR Systems, Inc., Wilsonville, OR (US)

( * ) Notice: Subject to any disclaimer, the term of this patent is extended or adjusted under 35 U.S.C. 154(b) by 397 days.

(21) Appl. No.: 13/165,573

(22) Filed: Jun. 21, 2011

(65) Prior Publication Data

US 2012/0327230 A1 Dec. 27, 2012

(51) Int. Cl.
- *H04N 7/18* (2006.01)
- *B64D 3/00* (2006.01)
- *G03B 17/00* (2006.01)

(52) U.S. Cl.
USPC .................. 348/148; 244/3; 396/428

(58) Field of Classification Search
USPC .............. 348/148; 396/12–13, 428; 244/3
See application file for complete search history.

(56) References Cited

U.S. PATENT DOCUMENTS

| | | |
|---|---|---|
| 3,335,989 A | 8/1967 | Bachman et al. |
| 4,681,293 A | 7/1987 | Cucci et al. |
| 4,686,866 A | 8/1987 | Rosheim |
| 5,123,621 A | 6/1992 | Gates |
| 5,368,271 A | 11/1994 | Kiunke et al. |
| 5,890,569 A | 4/1999 | Goepfert |
| 6,012,680 A * | 1/2000 | Edberg et al. ............ 244/173.2 |
| 6,020,955 A | 2/2000 | Messina |
| 6,022,005 A | 2/2000 | Gran et al. |
| 6,154,317 A | 11/2000 | Segerstrom et al. |
| 6,354,559 B1 | 3/2002 | Eisentraut |
| 6,405,975 B1 * | 6/2002 | Sankrithi et al. ............ 244/1 R |
| 6,512,509 B1 | 1/2003 | McVicar |
| 6,578,682 B2 | 6/2003 | Braman et al. |
| 6,871,561 B2 | 3/2005 | Denice, Jr. et al. |
| 7,883,071 B2 | 2/2011 | Fox et al. |
| 2002/0145077 A1 | 10/2002 | Shultz |
| 2003/0159535 A1 | 8/2003 | Grover et al. |
| 2004/0046450 A1 | 3/2004 | Yoshida et al. |
| 2009/0140845 A1 * | 6/2009 | Hioki ........................ 340/425.5 |
| 2010/0032876 A1 * | 2/2010 | Hiley et al. ................ 267/140.5 |
| 2011/0001007 A1 | 1/2011 | Fox et al. |
| 2012/0104169 A1 * | 5/2012 | von Flotow et al. .......... 244/131 |
| 2012/0105634 A1 * | 5/2012 | Meidan et al. ................ 348/143 |

FOREIGN PATENT DOCUMENTS

WO    WO 85/04847    11/1985

OTHER PUBLICATIONS

Blochwitz et al., "ISOMAG 1.2 Extensions and Improvements," Publication Series from the Federal Institute for Occupational Safety and Health, English part, 2004.

* cited by examiner

*Primary Examiner* — Dave Czekaj
*Assistant Examiner* — Tsion B Owens
(74) *Attorney, Agent, or Firm* — Kolisch Hartwell, P.C.

(57) ABSTRACT

System, including method and apparatus, for imaging with a vehicle-mounted camera having an optical axis that is restricted from angular displacement, in response to vibration, by passive stabilization via a set of vibration isolators.

20 Claims, 4 Drawing Sheets

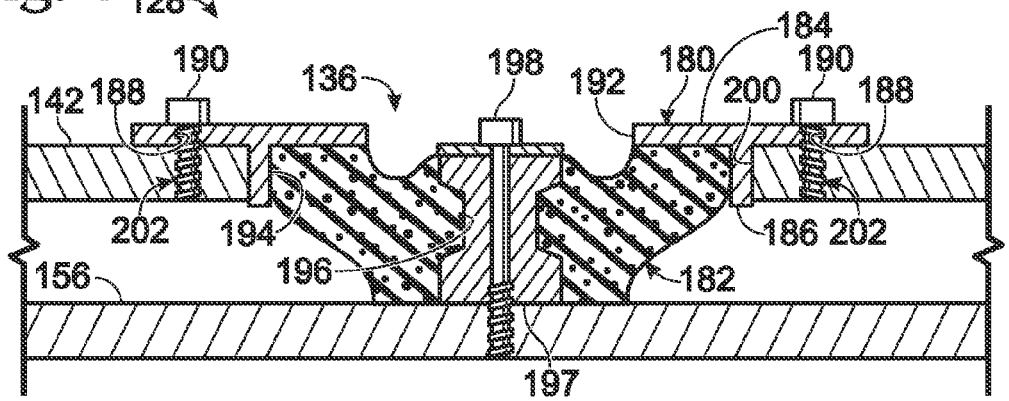
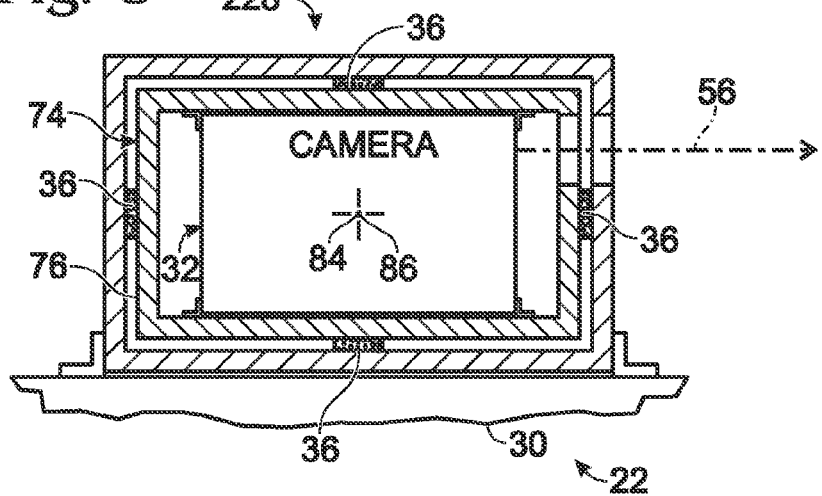
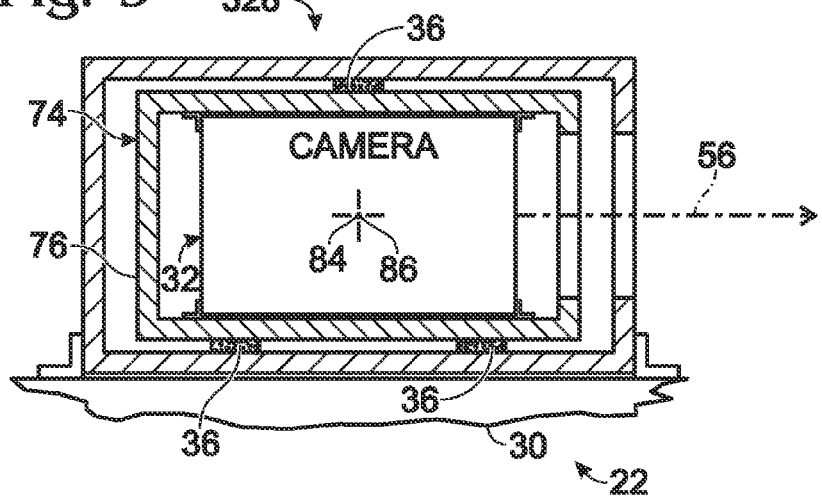

US 8,711,223 B2

VEHICLE-MOUNTED CAMERA STABILIZED PASSIVELY BY VIBRATION ISOLATORS

INTRODUCTION

A vehicle, such as an aircraft, may be equipped with a camera that facilitates navigation by supplying images of the surrounding airspace and/or the ground below. The camera may enhance the ability to navigate safely and effectively. For example, the camera may provide a line of sight not available to the vehicle operator and/or may detect optical radiation, such as infrared radiation, that is not visible to the human eye.

Vehicle acceleration, shock, and vibrations can degrade camera performance. Images from the camera can be blurred if the field of view of the camera is not stabilized during vehicle travel and changes suddenly and/or repetitively. In particular, tiny changes to the angular orientation of the camera, relative to the vehicle, can produce unacceptably large shifts in image position within the field of view, even if the camera is being used to view a distant scene. Also, sensitive components of the camera may be damaged if not isolated from shock and vibration.

The camera may be isolated with an active isolation system, such as a gimbal system that connects the camera to the vehicle. The gimbal system may include gyros, accelerometers, motors, and the like, to sense positional changes of the camera and apply compensating forces or movements. Active vibration isolation will, in general, require a control system with great accuracy, high gain, and considerable speed. Moreover, active isolation requires a relatively high power consumption. Such active systems also are costly and present volumetric challenges.

A more effective, space-efficient, and/or low cost approach to vibration isolation is needed for stabilization of a vehicle-mounted camera.

SUMMARY

The present disclosure provides a system, including method and apparatus, for imaging with a vehicle-mounted camera having an optical axis that is restricted from angular displacement, in response to vibration, by passive stabilization via a set of vibration isolators.

BRIEF DESCRIPTION OF THE DRAWINGS

FIG. 7 is a fragmentary, sectional view of the imaging apparatus of FIG. 4, taken generally along line 7-7 of FIG. 4 through one of the vibration isolators and associated regions of the inner and outer frames.

FIG. 8 is a schematic sectional view of selected aspects of another exemplary imaging apparatus with another arrangement of vibration isolators disposed between inner and outer frames, in accordance with aspects of the present disclosure.

FIG. 9 is a schematic sectional view of selected aspects of yet another exemplary imaging apparatus with yet another arrangement of vibration isolators disposed between inner and outer frames, in accordance with aspects of present disclosure.

DETAILED DESCRIPTION

Figure 1:
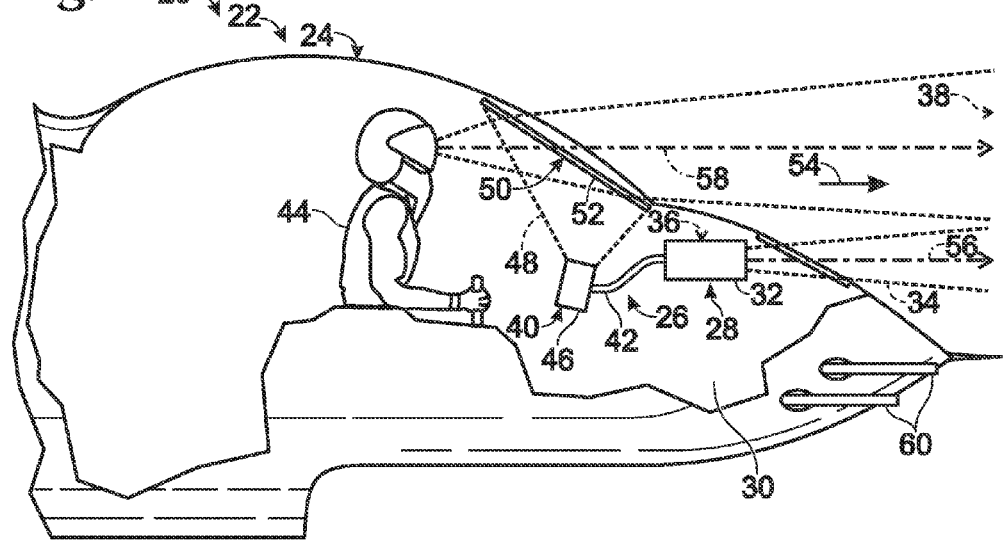
FIG. 1 is a schematic, fragmentary side view of an exemplary vehicle system including a vehicle and a video system with a camera defining an optical axis that is restricted from angular displacement, in response to vibration of the vehicle, by passive stabilization via a set of vibration isolators, in accordance with aspects of present disclosure.

The present disclosure provides a system, including method and apparatus, for imaging with a vehicle-mounted camera having an optical axis that is restricted from angular displacement, in response to vibration, by passive stabilization via a set of vibration isolators.

A method of imaging for a vehicle is provided. In the method, an imaging apparatus may be mounted to a body of a vehicle. The imaging apparatus may include a frame, a payload assembly including a camera, and a plurality of vibration isolators. Each vibration isolator may be secured to the payload assembly and the frame such that the frame supports the payload assembly via the vibration isolators. The vibration isolators may define a center of elasticity that is substantially coincident with the center of mass of the payload assembly. A video signal may be created that is representative of optical radiation, such as infrared radiation and/or visible light, detected from an external scene with the camera during travel of the vehicle. An optical axis defined by the camera may not be adjustable with respect to the body of the vehicle during travel of the vehicle and may be restricted from angular displacement, in response to vibration of the vehicle, by passive stabilization via the vibration isolators.

A video system for a vehicle is provided. The video system may comprise a payload assembly including a camera. The system also may comprise a frame adapted to be mounted fixedly to a body of a vehicle. The system further may comprise a plurality of vibration isolators each secured to the payload assembly and the frame such that the frame supports the payload assembly via the vibration isolators. The vibration isolators may define a center of elasticity that is substantially coincident with the center of mass of the payload assembly. An optical axis defined by the camera may be restricted from angular displacement with respect to the frame, in response to vibration of the frame, by passive stabilization via the vibration isolators.

A vehicle system with onboard imaging is provided. The vehicle system may comprise a vehicle including a vehicle body and a display. The vehicle system also may comprise a payload assembly including a camera that is operatively connected to the display and adapted to create a video signal that is representative of optical radiation (e.g., infrared radiation and/or visible light) detected from an external scene with the camera during travel of the vehicle. The vehicle system additionally may comprise a frame mounted fixedly to the vehicle body. The vehicle system further may comprise a plurality of vibration isolators each secured to the payload assembly and the frame such that the frame supports the payload assembly via the vibration isolators. The vibration isolators may define a center of elasticity that is substantially coincident with the center of mass of the payload assembly. An optical axis defined by the camera may not be adjustable with respect to the vehicle body during travel of the vehicle and may be restricted from angular displacement, in response to vibration of the vehicle, by passive stabilization via the vibration isolators.

The vehicle and video systems disclosed herein may offer substantial advantages over other vehicle-based systems. These advantages may include lower cost, sharper images, easier installation, less maintenance, a longer life, or any combination thereof, among others.

Further aspects of the vehicle and video systems are described in the following sections: (I) definitions, (II) exemplary vehicle system, and (III) examples.

I. DEFINITIONS

Technical terms used in this disclosure have the meanings that are commonly recognized by those skilled in the art. However, the following terms may have additional meanings, as described below. The wavelength ranges identified in these meanings are exemplary, not limiting, and may overlap slightly, depending on source or context. The wavelength ranges lying between about 1 nm and about 1 mm, which include ultraviolet, visible, and infrared radiation, and which are bracketed by x-ray radiation and microwave radiation, may collectively be termed optical radiation.

Ultraviolet radiation. Electromagnetic radiation invisible to the human eye and having wavelengths from about 100 nm, just longer than x-ray radiation, to about 400 nm, just shorter than violet light in the visible spectrum. Ultraviolet radiation includes (A) UV-C (from about 100 nm to about 280 or 290 nm), (B) UV-B (from about 280 or 290 nm to about 315 or 320 nm), and (C) UV-A (from about 315 or 320 nm to about 400 nm).

Visible light. Electromagnetic radiation visible to the normal human eye and having wavelengths from about 360 or 400 nanometers, just longer than ultraviolet radiation, to about 760 or 800 nanometers, just shorter than infrared radiation. Visible light typically may be imaged and detected by the unaided human eye and includes violet (about 390-425 nm), indigo (about 425-445 nm), blue (about 445-500 nm), green (about 500-575 nm), yellow (about 575-585 nm), orange (about 585-620 nm), and red (about 620-740 nm) light, among others.

Infrared (IR) radiation. Electromagnetic radiation invisible to the human eye and having wavelengths from about 700 or 800 nanometers, just longer than red light in the visible spectrum, to about 1 millimeter, just shorter than microwave radiation. Infrared radiation includes (A) IR-A (from about 700 nm to about 1,400 nm), (B) IR-B (from about 1,400 nm to about 3,000 nm), and (C) IR-C (from about 3,000 nm to about 1 mm). IR radiation, particularly IR-C, may be caused or produced by heat and may be emitted by an object in proportion to its temperature and emissivity. Portions of the infrared having wavelengths between about 3,000 and 5,000 nm (i.e., between about 3 and 5 µm) and between about 8,000 and 12,000 nm (i.e., between about 8 and 12 µm) may be especially useful in thermal imaging, because they correspond to minima in atmospheric absorption and thus are more easily detected (particularly at a distance). The particular interest in relatively shorter wavelength IR has led to the following classifications: (A) near infrared (NIR) (from about 780 nm to about 1,000 nm (1 µm)), (B) short-wave infrared (SWIR) (from about 1,000 nm (1 µm) to about 3,000 nm (3 µm)), (C) mid-wave infrared (MWIR) (from about 3,000 nm (3 µm) to about 8,000 nm (8 µm), or about 3 µm to 5 µm), (D) long-wave infrared (LWIR) (from about 8,000 nm (8 µm) to about 15,000 nm (15 µm) or about 8 µm to 12 µm), and (E) very long-wave infrared (VLWIR) or far infrared (FIR) (from about 15,000 nm (15 µm) to about 1 mm). Portions of the infrared, particularly portions in the far or thermal IR having wavelengths between about 0.1 and 1 mm, may alternatively, or in addition, be termed millimeter-wave (MMV) wavelengths.

Camera. An image sensor alone or in combination with input optics that transmit incident radiation to the sensor. A camera may be described according to the wavelength band that is detected, as determined by a combination of the spectral sensitivity of the sensor and the spectral selectivity, if any, of the input optics. A camera may, for example, be a visible light camera that predominantly or exclusively detects visible light, an ultraviolet camera that predominantly or exclusively detects ultraviolet radiation, or an infrared camera that predominantly or exclusively detects infrared radiation. If an infrared camera, the camera may be a short-wave infrared camera that predominantly or exclusively detects SWIR (and/or NIR), a mid-wave infrared camera that predominantly or exclusively detects MWIR, a long-wave infrared camera that predominantly or exclusively detects LWIR, or a combination thereof (e.g., an MWIR/LWIR camera), among others.

Vibration isolator. An isolation device capable of "isolating" an object from a source of vibrations by reducing or eliminating transmission of vibrations from the source to the object, generally by attenuating the amplitude of the vibrations. The isolation device may operate in a frequency-dependent manner, to selectively attenuate some frequencies of vibration more than others. In some cases, the isolation device(s) alone or in combination with the object may have a natural frequency at which vibrations are amplified. Vibrations substantially above (and/or below) the natural frequency may be attenuated or eliminated. The natural frequency may be selected to be significantly below (and/or above) the primary driving frequency (or frequencies) of the source of vibration.

The isolation device may have any suitable structure. The device may comprise a body and, optionally, a bracket attached to the body. The body may be an elastomeric body, that is, a body composed of one or more elastomers. Alternatively, or in addition, the isolation device may be characterized as a combination of an elastic element (a spring) and, optionally, a damper. The damper may be integral to the elastic element or may be a separate component(s)/material(s).

Payload. Any object or set of objects conveyed by a vehicle. A payload, also termed a payload assembly, may include at least one instrument, such as an optical instrument (e.g., a camera), one or more frame members, casings, fasteners, or any combination thereof, among others. A payload may define the total mass supported cooperatively by a set of vibration isolators.

Center of elasticity. A point at which the center of mass of a payload can be located, with respect to a set of vibration isolators that support the payload, to minimize coupling between linear motion and rotational motion. In particular, with the payload's center of mass situated at the point, application of a linear force on the payload in any direction through the point results in pure translational motion of the payload, and application of a moment on the payload in any orientation about the point results in pure rotational motion of the payload. Accordingly, with the payload's center of mass substantially coincident with the center of elasticity, linear motion (e.g., caused by vibrations or shocks) transmitted from a larger support structure (such as a vehicle) to the payload does not result in substantial angular motion of the payload.

Vehicle. A machine that transports a person(s) and/or objects. The machine may be a platform to which an imaging apparatus and/or video system is mounted. Exemplary vehicles include a ground vehicle (e.g., a car, truck, motorcycle, tank, etc.), a watercraft (e.g., a boat, submarine, carrier, etc.), an aircraft (e.g., a fixed-wing piloted aircraft (such as a jet or a propeller-driven plane), pilotless remote-controlled aircraft, helicopter, drone, missile, dirigible, aerostat balloon, rocket, etc.), or the like. A vehicle includes a body, namely, a main part of the vehicle. The body may include a frame and a housing or covering that at least substantially encloses the frame, among others.

II. EXEMPLARY VEHICLE SYSTEM

FIG. 1 shows an exemplary vehicle system 20, which may be termed a transportation system, including a vehicle 22, such as an aircraft 24, with an onboard video system 26. The video system may be equipped with an imaging apparatus 28 mounted to a body 30 of the vehicle, such as mounted to a nose region of the aircraft. Imaging apparatus 28 may comprise a camera 32 having a field of view 34 that remains substantially fixed (and non-adjustable) with respect to body 30 of the vehicle, during vehicle travel. In particular, the field of view may be stabilized passively by a set of vibration isolators 36 that support the camera. The isolators may function to restrict transmission of potentially damaging forces from the vehicle to the camera, without significantly reducing the quality of video images collected by the camera.

The camera may create a video signal that is representative of optical radiation detected over time from an external scene 38. The optical radiation detected may be infrared radiation, visible light, ultraviolet radiation, or a combination thereof, among others. In some cases, the camera may predominantly detect infrared radiation. The camera may (or may not) have a wide field of view, such as an angle of view of at least about 10 degrees, among others.

Video system 26 also may be equipped with a display 40 that is operatively connected, indicated at 42, to camera 32. The connection may provide wired and/or wireless communication between the camera and the display. The display may be configured to form images with visible light, capable of being detected with the human eye, based on the video signal received from the camera. In other words, the display may provide a video that can be watched by a person, such as an operator, navigator, and/or pilot 44 (or a passenger), traveling in vehicle 22.

The display may, for example, include a projector 46 that projects a beam of visible light forming an image 48 onto a screen 50. The screen may be provided by a windshield 52 of the vehicle. Pilot 44 looking forward through windshield 52, at least generally in a direction of travel 54, thus may see video of external scene 38 superimposed on an actual view of the external scene available through the windshield. The video may be projected onto the windshield without substantial delay, such that the video is shown in real time, synchronized with the actual view. In other examples, the display may include a screen that is not provided by the vehicle itself.

The video and the pilot's actual view also may be aligned so that the pilot can integrate information from the actual view with positionally corresponding information from the video. To produce this alignment, an optical axis 56 defined by camera 32 may be at least substantially parallel to a line of sight 58 of the pilot looking forward out the windshield. Also, the images of the video may be sized, when viewed, to match the actual scene, thereby providing a perceived overlap or co-localization of each element visible in both the video and the actual scene.

Exemplary displays that may be suitable include liquid crystal displays (LCDs), light-emitting diode (LED) displays, organic light-emitting diode (OLED) displays, cathode ray tube (CRT) displays, phosphor displays, and so on. The display may be described as an electronic display.

The display may be capable of generating grayscale (or monochromatic) images, color images, or composites thereof. In some cases, only one or more selected regions of a substantially continuous, recorded image may be displayed, based, for example, on the selected regions meeting a predefined condition, such as exceeding a predefined temperature (or radiation intensity) and/or falling into a predefined temperature range (or intensity range), among others. With this approach, the displayed images may be less distracting and/or more informative to the vehicle operator.

Vehicle 22 may produce one or more predominant frequencies of vibration. In some cases, the vehicle may generate vibration with a frequency of about 150-250 Hz. The vehicle may carry one or more mounted guns 60, which may be configured to fire projectiles. Each gun may have any suitable firing frequency, such as about 5-50, 10-40, or 15-30 Hz, among others. In exemplary embodiments, the vehicle may be a jet carrying guns that fire at a frequency of about 18 Hz and 24 Hz. The natural frequency of isolators 36, collectively with a payload supported by the isolators, may be substantially different from the predominant frequencies of vibration produced by vehicle 22 and guns 60, if present, and from the resonance frequency of the payload itself (including the camera) supported by the isolators. In some cases, each of isolators 36, and/or the isolators collectively with the payload, may have a natural frequency of about 80-140, 90-130, or 100-120 Hz, among others.

Figure 2:
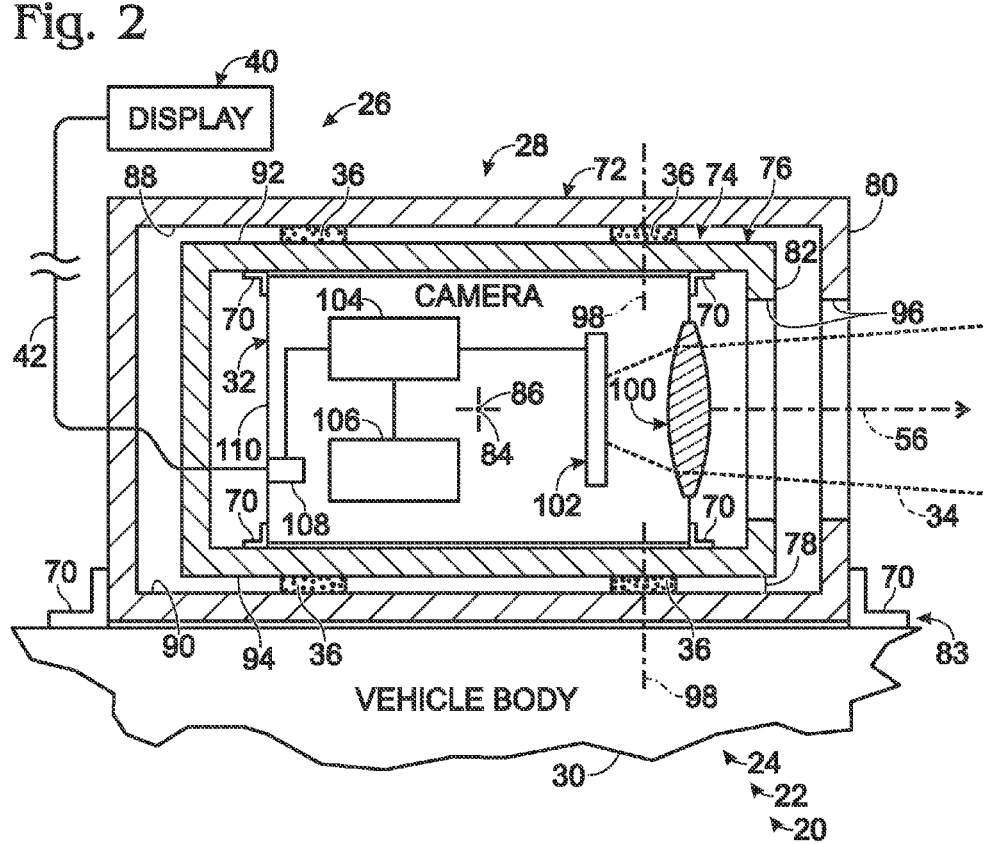
FIG. 2 is a schematic, fragmentary, and partially sectional top view of the vehicle system of FIG. 1, particularly selected aspects of the video system thereof, in accordance with aspects of present disclosure.

FIG. 2 shows a somewhat schematic, partially sectional view of video system 26, and particularly imaging apparatus 28, mounted to vehicle 22. Exemplary sites of fixed attachment between components are indicated by fastening mechanisms 70, each of which may, for example, include threaded fasteners (bolts, screws, nuts, etc.), rivets, a site of welding, an adhesive, brackets, or any combination thereof, among others.

Imaging apparatus 28 may include an outer frame 72 supporting a payload assembly 74 via a plurality of vibration isolators 36. The payload assembly may be equipped with an inner frame 76 to which camera 32 is fixedly mounted, to prevent motion of the camera relative to the inner frame. The isolators may be disposed in a gap 78 formed between an outer frame member 80 of outer frame 72 and an inner frame member 82 of inner frame 76. Each isolator may be secured to both outer and inner frame members 80, 82.

Isolators 36 define a center of elasticity, indicated at 84, that may be substantially coincident with a center of mass, indicated at 86, of payload assembly 74. Placement of the centers of elasticity and mass at the same point provides passive stabilization of the camera in the face of vibrations transmitted from the vehicle to the payload assembly. In particular, vehicle vibrations that are not fully damped by the isolators may produce translational motion of the camera, which shifts the optical axis without substantially affecting the field of view, since the shifted optical axis remains parallel. Accordingly, since these vibrations do not produce substantial angular displacement of optical axis 56 with respect to the aircraft, the field of view of the camera remains substantially fixed.

Outer frame 72, in turn, may be coupled fixedly to vehicle body 30, indicated by an arrow at 83, to prevent motion of the outer frame relative to the vehicle body during vehicle travel. This fixed coupling of the outer frame also may limit motion of the payload assembly relative to the vehicle body, except as permitted by deformation of the vibration isolators.

Frame members 80, 82 (and/or frames 72, 76) may have any suitable construction. Each frame member 80, 82 may be continuous or may be formed of two or more discrete components. The frame member may be at least generally rectangular in cross section, as shown here, or may have any other suitable shape. At least one pair of opposing walls (e.g., walls 88, 90 and walls 92, 94) may be provided by each frame member.

Each frame member may define and extend around a central cavity. The central cavity defined by outer frame member 80 may be sized to receive isolators 36 and payload assembly 74. The central cavity defined by inner frame member 82 may be sized to receive camera 32.

The frame members may be configured to avoid obstructing the field of view of the camera. For example, each frame member may define an opening 96 through which the camera may receive optical radiation along its optical axis 56 from the external scene. Alternatively, an optical window of the camera may be disposed outside of both frame members (and/or outside of the central cavity and/or envelope defined by each frame member). With this arrangement, optical radiation from the camera's entire field of view may be received by the camera without passing through an opening formed in a wall of either frame member (e.g., see Example 1).

Vibration isolators 36 may be present in any suitable number and arrangement to define a conveniently-positioned center of elasticity. The imaging apparatus may include at least two, three, four, or more vibration isolators that support payload assembly 74. The vibration isolators may have the same size and shape relative to one another or may be of different sizes and shapes. The vibration isolators may be disposed in the same plane or may not be coplanar. In some cases, all of the vibration isolators may be disposed adjacent only one pair of opposing walls of a frame member (and/or frame). For example, in the present illustration, all of the isolators 36 are disposed in a "two-wall arrangement" adjacent walls 88, 90 (and walls 92, 94) of frame member 80 (and frame member 82), and none is adjacent the other pair of opposing walls of the frame member.

A two-wall arrangement of isolators, as shown here, may be advantageous over a four-wall arrangement (e.g., see Example 2) because the two-wall arrangement places fewer restrictions on how the other walls of the frame members are structured and positioned. In any event, the isolators may be disposed adjacent walls that are at least generally parallel to optical axis 56, and may be absent from walls that are least generally orthogonal to the optical axis, because restricting motion of the camera along the optical axis may be least important. Translational motion of the camera parallel to the optical axis produces the smallest change in the field of view.

Each vibration isolator 36 defines a compression axis or central axis 98 along which the isolator can be predominantly compressed and stretched, relative to shear deformation of the isolator. The compression axes of the vibration isolators, or at least a pair thereof, may or may not be parallel or coaxial to one another and/or may or may not be disposed in the same plane. Any suitable number of the compression axes may extend through the center of elasticity, such as none (as shown here), at least one, at least a pair, or all of the compression axes. Each vibration isolator, and particularly the elastic portion thereof, may or may not be elongated along the compression axis. Furthermore, the elastic portion of each vibration isolator may have substantial circular symmetry about the compression axis, or may be elongated orthogonally to the compression axis, among others. In some cases, each vibration isolator may provide a substantially uniform stiffness, or resistance to movement of the payload assembly, in all directions.

Camera 32 may comprise optics 100 and a sensor 102 (also termed an image sensor). Optics 100 may gather, direct, filter, and/or focus incident radiation, such as infrared radiation, received from field of view 34. Sensor 102 may detect images formed by the optics on the sensor and convert the images into a representative video signal.

Optics 100, also termed an optical relay or optical relay structure, may be composed of one or more optical elements that transmit incident radiation to sensor 102. An optical element is any structure or device that collects, directs, and/or focuses optical radiation and/or selectively blocks undesired radiation. An optical element may function by any suitable mechanism, such as refracting, reflecting, diffracting, and/or filtering, among others, optical radiation. Exemplary optical elements include lenses, mirrors, gratings, prisms, filters, beam splitters, transmissive fibers (fiber optics), and/or the like. The optics may define an optical path traveled by incident radiation to the sensor. Also, the optics may provide an optical window through which optical radiation enters camera 32.

Sensor 102 may include any mechanism capable of detecting radiation of interest, for example, in the form of an image formed by the optics, and converting the detected radiation into a signal representative of the detected radiation or image. The sensor may create a video signal by detecting a series of images over time, such as at a constant rate of image detection. The sensor generally includes a two-dimensional array of photosensitive elements or pixels. The sensor may, for example, include a cooled or uncooled infrared sensor (such as a focal plane array or microbolometer), a visible light sensor (such as a CCD or CMOS device), or the like.

Camera 32 further optionally may comprise a processor 104, which also or alternatively may be termed a controller, and/or at least one data storage device 106 (i.e., memory). The processor may perform any suitable function or combination of functions, such as manipulating the video signal created by the sensor, controlling operation of the sensor, sending the video signal to display 40 via a communication port 108, retrieving stored image data from storage device 106, and the like. The processor may manipulate and send a video signal that is analog or digital. Furthermore, in some cases, the processor may convert an analog signal to a digital signal. Display 40 also or alternatively may include a processor/controller.

The camera may be covered and protected by a housing 110. The housing may seal the camera. In some embodiments, the housing may be attached more directly to vibration isolators 36, and inner frame member 82 and/or the inner frame may be provided by the housing itself.

III. EXAMPLES

The following examples describe selected aspects and embodiments of the present disclosure, such as exemplary configurations of imaging apparatus. These examples are intended for illustration and should not limit the entire scope of the present disclosure.

Example 1

Exemplary Vehicle-Mountable Imaging Apparatus

This example describes an exemplary embodiment 128 of vehicle-mountable imaging apparatus 28 for video system 26 of FIG. 1; see FIGS. 3-7.

Figure 3:
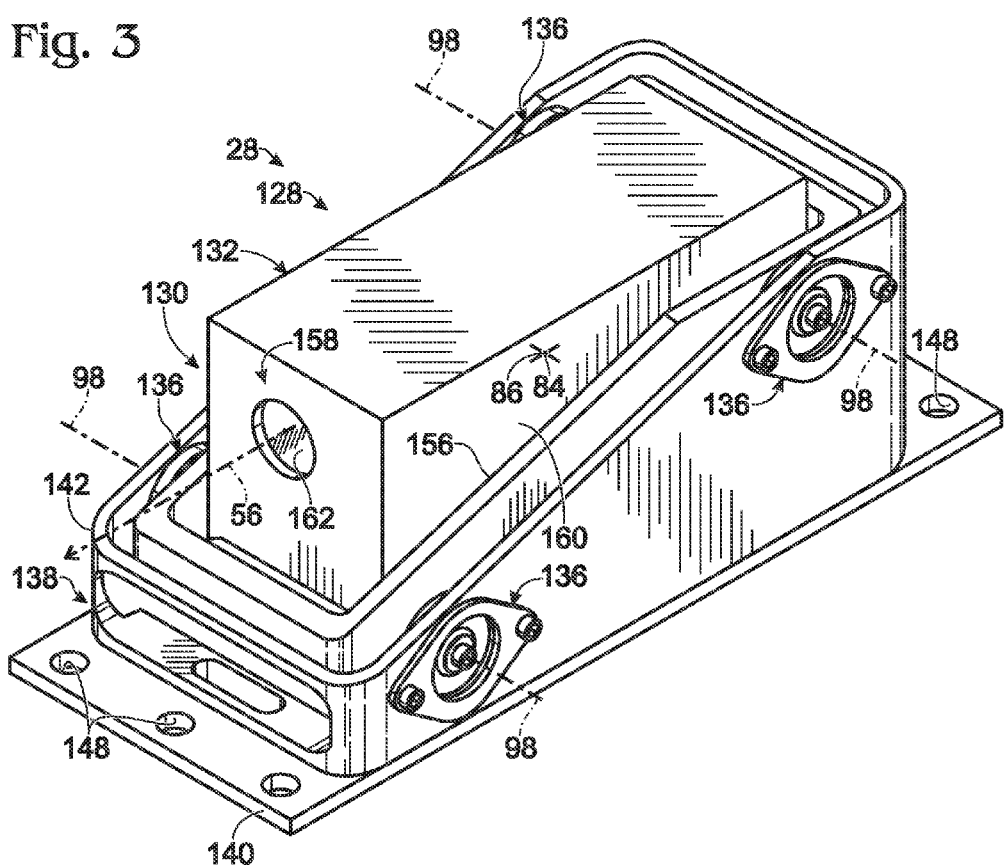
FIG. 3 is an isometric view of selected aspects of an exemplary embodiment of a vehicle-mountable imaging apparatus that may be incorporated into the video system of FIG. 1, in accordance with aspects of the present disclosure.
Figure 4:
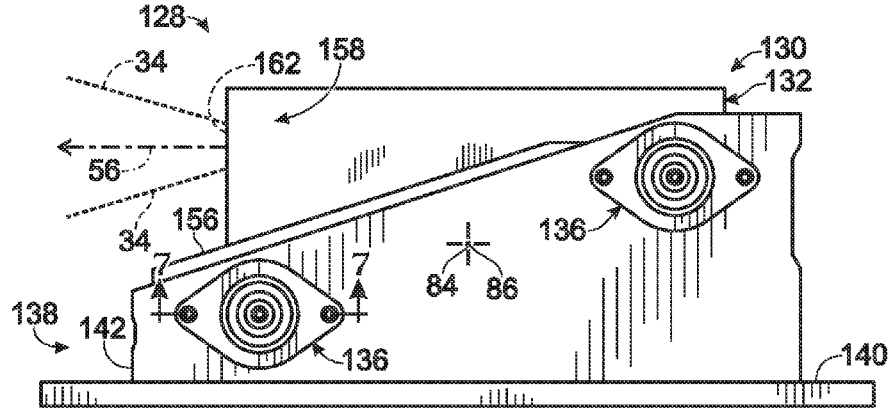
FIG. 4 is a side view of the imaging apparatus of FIG. 3.

FIGS. 3 and 4 show respective isometric and side views of imaging apparatus 128. Imaging apparatus 128 may have any suitable combination of the components and features described above for imaging apparatus 28 (see FIGS. 1 and 2) and/or elsewhere herein. Apparatus 128 is equipped with a payload assembly 130 that includes infrared camera 132. The payload assembly is supported and isolated by a set of four vibration isolators 136. The vibration isolators define a center of elasticity 84 that is substantially coincident with the center of mass 86 of the payload assembly. Furthermore, the vibration isolators define respective compression axes 98 that are at least substantially parallel to one another, such as within about 10 or 5 degrees of parallel.

The vibration isolators are supported by an outer frame 138. The outer frame includes a base 140 and an outer frame member 142 fixedly mounted on the base. The base includes mounting structure, such as apertures 148 and/or brackets to receive fasteners that secure the base to the body of the vehicle. When the apparatus is installed or serviced, the position and/or orientation of the base may be adjusted with respect to the vehicle body and then fixed. In this way, optical axis 56 of camera 132 can be adjusted relative to the vehicle body to improve the correspondence between the scene recorded by the camera and the actual scene viewed by the operator of the vehicle.

Camera 132, outer frame member 142, and an inner frame member (and/or inner frame) 156 are structured to permit the camera to record images from a wide field of view 34 (see FIG. 4). The camera includes a viewing portion 158 that projects above frame members 142, 156 and above a plane defined by vibration isolators 136. Furthermore, the viewing portion is disposed on an opposing side of the plane from base 140. The viewing portion provides an optical window 162 through which optical radiation enters the camera from field of view 34. The optical window is disposed outside of the frame members, in this case, elevated above frame members 142, 156.

Figure 5:
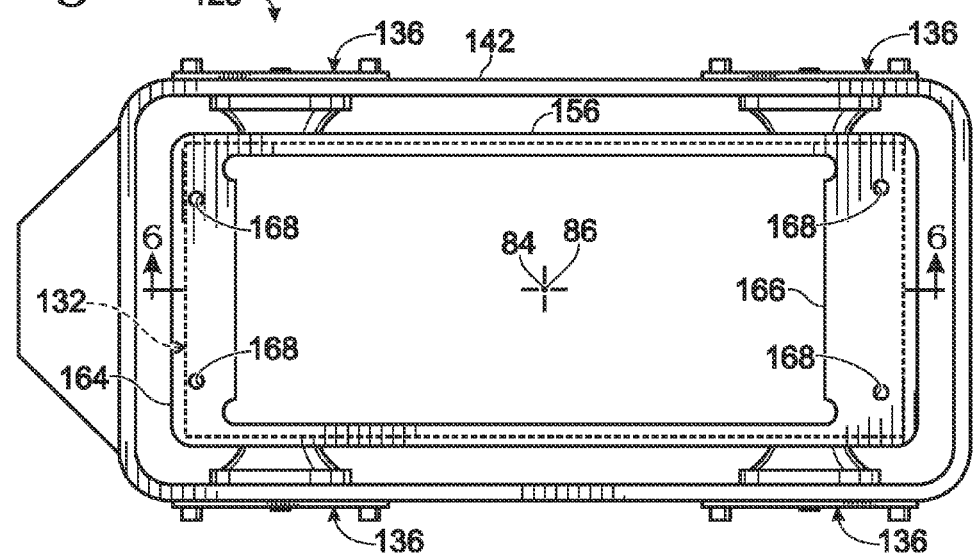
FIG. 5 is a top view of selected aspects of the imaging apparatus of FIG. 3, particularly an inner frame supporting a camera, an outer frame, and a plurality of vibration isolators each secured to both frames.

FIG. 5 shows a top view of selected aspects of imaging apparatus 128, particularly outer frame member 142, inner frame member 156, and vibration isolators 136 each secured to both frame members. Camera 132 is not present but is indicated in dashed outline. Vibration isolators 136, and the gap formed between the outer and inner frame members, permit movement of inner frame member 156 relative to outer frame member 142 in any direction through deformation of the elastic portion of the vibration isolators.

Figure 6:
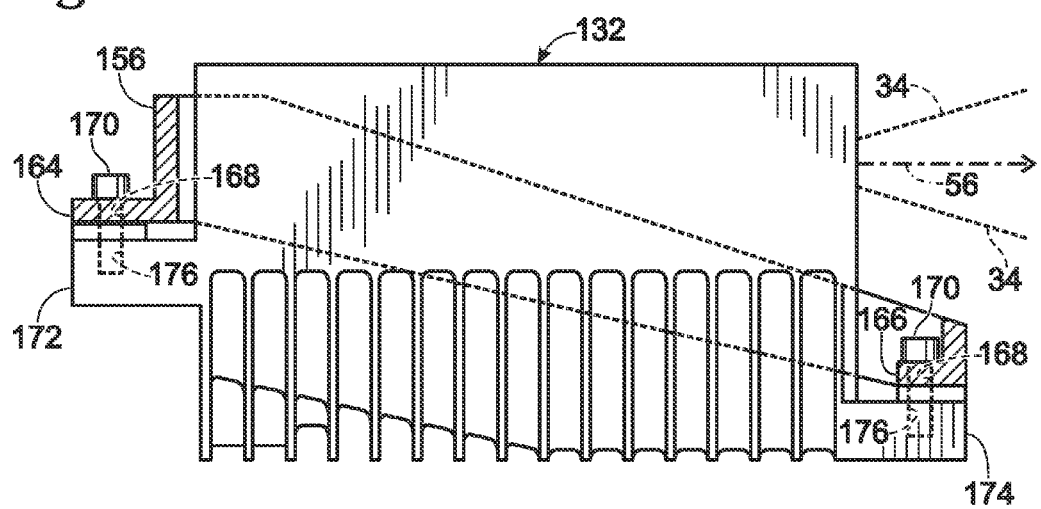
FIG. 6 is a partially sectional view of selected aspects of the imaging apparatus of FIG. 3, taken generally along line 6-6 of FIG. 5 to illustrate fixed attachment of the camera to the inner frame.

FIGS. 5 and 6 illustrate how camera 132 is fixed to inner frame member 156. Inner frame member 156 is equipped with opposing flanges 164, 166 that define a plurality of apertures 168 sized to receive threaded fasteners 170. Opposing ends of camera 132 form mounting blocks 172, 174 that are abutted with respective flanges 164, 166 of the inner frame member. The mounting blocks define internally threaded holes 176 aligned coaxially with apertures 168. Fasteners 170 extend through apertures 168 and into threaded engagement with the mounting blocks at threaded holes 176.

FIG. 7 shows a fragmentary, sectional view of imaging apparatus 128 taken through one of vibration isolators 136 and associated regions of inner and outer frame members 142, 156. The vibration isolators each include a mounting bracket 180 and an elastic member 182 attached to the mounting bracket.

The mounting bracket includes a plate region 184 and a cylindrical flange 186 joined to and projecting from the plate region. Through-holes 188 for fasteners 190 and a central aperture 192 are defined by plate region 184. The plate region may, for example, be formed of metal.

Elastic member 182 is received in a cavity 194 formed by the plate region and is abutted with inner surfaces of the plate region and the cylindrical flange. The elastic member defines a central cavity 196 for receiving a core 197, which may be metal. A fastener 198 extends through an aperture defined by the core and into inner frame member 156.

Vibration isolator 136 is installed as follows. Cylindrical flange 186 is received in an opening 200 defined by outer frame member 142. Fasteners 190 are placed into threaded engagement with outer frame member 142, as indicated by arrows at 202. Also, a leading end of fastener 198 is disposed in threaded engagement with inner frame member 156. When installed, each vibration isolator may be placed in a loaded (i.e., compressed) configuration, which generally increases the useful lifetime of the elastic member. Accordingly, all of the vibration isolators may be pre-loaded when the payload assembly is situated at its neutral position, where there is no net restoring force from the vibration isolators collectively.

Example 2

Exemplary Isolator Arrangements

This example describes exemplary alternative arrangements of vibration isolators for supporting payload assembly 74 including camera 32; see FIGS. 8 and 9.

FIG. 8 shows an exemplary imaging apparatus 228 mounted to vehicle body 30. Imaging apparatus 228 may have any of the components and features described elsewhere herein, such as for imaging apparatus 28 and/or 128. For example, imaging apparatus 228 may include vibration isolators 36 disposed between inner and outer frames of the apparatus and supporting payload assembly 74. The vibration isolators collectively may define a center of elasticity 84 that is coincident with the center of mass 86 of the payload assembly. However, in contrast to the configurations described above (e.g., see FIG. 2), the vibration isolators may be disposed in a four-wall arrangement in which each isolator is disposed adjacent and secured to a different wall of the payload assembly and/or a frame member thereof. In other words, inner frame 76 of the payload assembly may include two pairs of opposing walls, and a distinct vibration isolator may be disposed adjacent each of the four walls.

FIG. 9 shows another exemplary imaging apparatus 328 mounted to vehicle body 30. Imaging apparatus 328 may have any of the components and features described elsewhere herein, such as for imaging apparatus 28, 128, and/or 228. For example, imaging apparatus 328 may include vibration isolators 36 disposed between inner and outer frames of the apparatus and supporting payload assembly 74. The vibration isolators collectively may define a center of elasticity 84 that is coincident with the center of mass 86 of the payload assembly. Also, the vibration isolators may be disposed in a two-wall arrangement (e.g., see FIG. 2) with the isolators disposed adjacent only a pair of opposing walls of inner frame 76 of the payload assembly. However, the isolators may be arranged with an unequal number of vibration isolators disposed adjacent each of the opposing walls, such as one isolator adjacent one of the walls and two isolators adjacent the other opposing wall. In other embodiments, inner frame 76 may have a more circular geometry.

Example 3

Selected Embodiments

This example describes selected embodiments of the present disclosure as a series of numbered paragraphs.

1. A method of imaging for a vehicle, the method comprising: (A) mounting an imaging apparatus to a body of a vehicle, the imaging apparatus including a frame, a payload assembly including a camera, and a plurality of vibration isolators each secured to the payload assembly and the frame such that the frame supports the payload assembly via the vibration isolators, the vibration isolators defining a center of elasticity that is substantially coincident with the center of mass of the payload assembly; and (B) creating a video signal that is representative of optical radiation detected from an external scene with the camera during travel of the vehicle, wherein an optical axis defined by the camera is not adjustable with respect to the body of the vehicle during travel of the vehicle and is restricted from angular displacement, in response to vibration of the vehicle, by passive stabilization via the vibration isolators.

2. The method of paragraph 1, wherein the frame is an outer frame, wherein the payload assembly includes an inner frame to which the camera is fixedly coupled, and wherein each vibration isolator is disposed between the inner frame and the outer frame.

3. The method of paragraph 1 or 2, wherein each vibration isolator defines a compression axis, and wherein the compression axis of one or more of the vibration isolators does not extend through the center of mass of the payload assembly.

4. The method of paragraph 3, wherein none of the vibration isolators defines a compression axis that extends through the center of mass of the payload assembly.

5. The method of paragraph 3 or 4, wherein the vibration isolators define at least two compression axes that are substantially parallel to each other.

6. The method of paragraph 5, wherein all of the compression axes defined by the vibration isolators are parallel to one another.

7. The method of any of paragraphs 1 to 6, wherein the frame is an outer frame, wherein the payload assembly includes an inner frame that includes a pair of walls that oppose each other, and wherein each of the vibration isolators is secured to a wall of the pair of walls.

8. The method of paragraph 7, wherein a same number of the vibration isolators are secured to each wall of the pair of walls.

9. The method of any of paragraphs 1 to 8, wherein the plurality of vibration isolators are disposed in a same plane.

10. The method of any of paragraphs 1 to 9, wherein each vibration isolator provides a substantially uniform resistance to movement of the payload assembly in all directions.

11. The method of any of paragraphs 1 to 10, wherein the camera includes an optical window disposed outside the frame.

12. The method of any of paragraphs 1 to 11, wherein the optical axis defined by the camera is substantially parallel to a direction of travel defined by the vehicle.

13. The method of any of paragraphs 1 to 12, wherein the video signal encodes images, further comprising a step of displaying the images on a windshield of the vehicle.

14. The method of paragraph 13, wherein the step of displaying the images includes a step of projecting the images onto the windshield, and wherein the images are representative of detected infrared radiation and are formed with visible light.

15. The method of paragraph 14, and wherein the step of displaying the images includes a step of superimposing the images on an actual view of the external scene available to an operator of the vehicle looking forward through the windshield.

16. The method of any of paragraphs 1 to 15, wherein the vehicle is an aircraft having a resonance frequency, and wherein the vibration isolators and the payload assembly collectively have a natural frequency that is substantially lower than the resonance frequency of the aircraft.

17. The method of paragraph 16, wherein the natural frequency is about 80 to 140 Hz.

The method of paragraph 16, wherein the resonance frequency is at least about 150 Hz.

19. The method of any of paragraphs 1 to 18, wherein the vehicle is an aircraft.

20. The method of paragraph 19, wherein the aircraft is a jet including one or more mounted weapons configured to fire projectiles.

21. The method of paragraph 20, wherein operation of at least one of the mounted weapons produces vibrations having a frequency of about 15 to 30 Hz.

22. A video system for a vehicle, comprising: (A) a payload assembly including a camera; (B) a frame adapted to be mounted fixedly to a body of a vehicle; and (C) a plurality of vibration isolators each secured to the payload assembly and the frame such that the frame supports the payload assembly via the vibration isolators, the vibration isolators defining a center of elasticity that is substantially coincident with the center of mass of the payload assembly, wherein an optical axis defined by the camera is restricted from angular displacement with respect to the frame, in response to vibration of the frame, by passive stabilization via the vibration isolators.

23. The video system of paragraph 22, wherein the camera is an infrared camera.

24. The video system of paragraph 23, wherein the infrared camera is capable of detecting short-wave infrared radiation, long-wave infrared radiation, or both.

25. The video system of any of paragraphs 22 to 24, further comprising a projector operatively connected to the camera and adapted to form images with visible light based on a video signal created by the camera.

26. The video system of any of paragraphs 22 to 25, wherein the frame is an outer frame, further comprising an inner frame including a pair of walls that oppose each other, and wherein each of the vibration isolators is secured to a wall of the pair of walls.

27. A vehicle system with onboard imaging, comprising: (A) a vehicle including a vehicle body and a display; (B) a payload assembly including a camera that is operatively connected to the display and adapted to create a video signal that is representative of optical radiation detected from an external scene with the camera during travel of the vehicle; (C) a frame mounted fixedly to the vehicle body; and (D) a plurality of vibration isolators each secured to the payload assembly and the frame such that the frame supports the payload assembly via the vibration isolators, the vibration isolators defining a center of elasticity that is substantially coincident with the center of mass of the payload assembly, wherein an optical axis defined by the camera is not adjustable with respect to the vehicle body during travel of the vehicle and is restricted from angular displacement, in response to vibration of the vehicle, by passive stabilization via the vibration isolators.

28. The vehicle system of paragraph 27, wherein the display includes a projector adapted to project images onto a windshield of the vehicle, and wherein the images are representative of infrared radiation and are formed with visible light based on the video signal.

29. The vehicle system of paragraph 28, and wherein the projector is configured to superimpose the images on an actual view of the external scene available to an operator of the vehicle looking forward through the windshield.

30. The vehicle system of any of paragraphs 27 to 29, wherein the vehicle defines a direction of travel that is at least substantially parallel to the optical axis.

31. The vehicle system of any of paragraphs 27 to 30, wherein the frame is an outer frame, wherein the payload assembly includes an inner frame to which the camera is coupled fixedly, and wherein each vibration isolator is disposed between the inner frame and the outer frame.

32. The vehicle system of any of paragraphs 27 to 31, wherein each vibration isolator defines a compression axis, and wherein the compression axis of one or more of the vibration isolators does not extend through the center of mass of the payload assembly.

33. The vehicle system of paragraph 32, wherein none of the vibration isolators has a compression axis that extends through the center of mass of the payload assembly.

34. The vehicle system of paragraph 32, wherein the vibration isolators define at least two compression axes that are substantially parallel to each other.

35. The vehicle system of paragraph 34, wherein all of the compression axes defined by the vibration isolators are substantially parallel to one another.

36. The vehicle system of any of paragraphs 27 to 35, wherein the frame is an outer frame, wherein the payload assembly includes an inner frame to which the camera is coupled fixedly, wherein the inner frame includes a pair of walls that oppose each other, and wherein each of the vibration isolators is disposed adjacent a wall of the pair of walls.

37. The vehicle system of paragraph 36, wherein a same number of the vibration isolators are disposed adjacent each wall of the pair of walls 38. The vehicle system of any of paragraphs 27 to 37, wherein the vehicle is an aircraft having a resonance frequency, and wherein the vibration isolators and payload assembly collectively have a natural frequency that is substantially lower than the resonance frequency.

39. The vehicle system of any of paragraphs 27 to 38, wherein the vehicle is an aircraft.

40. The vehicle system of paragraph 39, wherein the aircraft is a jet including one or more mounted weapons adapted to fire projectiles.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements. Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

The invention claimed is:

1. A method of imaging for a vehicle, the method comprising:
   mounting an imaging apparatus to a body of a vehicle, the imaging apparatus including a frame, a payload assembly including a camera, and a plurality of vibration isolators each secured to the payload assembly and the frame such that the frame supports the payload assembly via the vibration isolators, the vibration isolators defining a center of elasticity that is substantially coincident with the center of mass of the payload assembly; and
   creating a video signal that is representative of optical radiation detected from an external scene with the camera during travel of the vehicle,
   wherein an optical axis defined by the camera is not adjustable with respect to the body of the vehicle during travel of the vehicle and is restricted from angular displacement, in response to vibration of the vehicle, by passive stabilization via the vibration isolators,
   wherein each of the plurality of vibration isolators defines a compression axis, and wherein the compression axes defined by the plurality of vibration isolators are all disposed in a same plane.

2. The method of claim 1, wherein the frame is an outer frame, wherein the payload assembly includes an inner frame to which the camera is fixedly coupled, wherein the outer frame extends around the inner frame, and wherein each vibration isolator is disposed between the inner frame and the outer frame.

3. The method of claim 1, wherein the compression axis of one or more of the vibration isolators does not extend through the center of mass of the payload assembly.

4. The method of claim 3, wherein none of the vibration isolators defines a compression axis that extends through the center of mass of the payload assembly.

5. The method of claim 3, wherein the vibration isolators define at least two compression axes that are substantially parallel to each other.

6. The method of claim 1, wherein the frame is an outer frame, wherein the payload assembly includes an inner frame that includes a pair of walls that oppose each other, wherein the outer frame extends around the inner frame, and wherein each of the vibration isolators is secured to a wall of the pair of walls.

7. The method of claim 6, wherein a same number of the vibration isolators are secured to each wall of the pair of walls.

8. The method of claim 1, wherein the plurality of vibration isolators are disposed in a same plane.

9. The method of claim 1, wherein the camera includes an optical window disposed outside the frame.

10. The method of claim 1, wherein the video signal encodes images, further comprising a step of displaying the images on a windshield of the vehicle.

11. The method of claim 10, and wherein the step of displaying the images includes a step of superimposing the images on an actual view of the external scene available to an operator of the vehicle looking forward through the windshield.

12. The method of claim 1, wherein the vehicle has a resonance frequency, and wherein the vibration isolators and the payload collectively have a natural frequency that is substantially lower than the resonance frequency of the vehicle.

13. A video system for a vehicle, comprising:
a payload assembly including a camera;
a frame adapted to be mounted fixedly to a body of a vehicle; and
a plurality of vibration isolators each secured to the payload assembly and the frame such that the frame supports the payload assembly via the vibration isolators, the vibration isolators defining a center of elasticity that is substantially coincident with the center of mass of the payload assembly,
wherein an optical axis defined by the camera is restricted from angular displacement with respect to the frame, in response to vibration of the frame, by passive stabilization via the vibration isolators,
wherein each of the plurality of vibration isolators defines a compression axis, and wherein the compression axes defined by the plurality of vibration isolators are all disposed in a same plane.

14. The video system of claim 13, wherein the camera is an infrared camera.

15. The video system of claim 13, further comprising a projector operatively connected to the camera and adapted to form images with visible light based on a video signal created by the camera.

16. The video system of claim 13, wherein the frame is an outer frame, further comprising an inner frame including a pair of walls that oppose each other, wherein the outer frame extends around the inner frame, and wherein each of the vibration isolators is secured to a wall of the pair of walls.

17. A vehicle system with onboard imaging, comprising:
a vehicle including a vehicle body and a display;
a payload assembly including a camera that is operatively connected to the display and adapted to create a video signal that is representative of optical radiation detected from an external scene with the camera during travel of the vehicle;
a frame mounted fixedly to the vehicle body; and
a plurality of vibration isolators each secured to the payload assembly and the frame such that the frame supports the payload assembly via the vibration isolators, the vibration isolators defining a center of elasticity that is substantially coincident with the center of mass of the payload assembly,
wherein an optical axis defined by the camera is not adjustable with respect to the vehicle body during travel of the vehicle and is restricted from angular displacement, in response to vibration of the vehicle, by passive stabilization via the vibration isolators,
wherein each of the plurality of vibration isolators defines a compression axis, and wherein the compression axes defined by the plurality of vibration isolators are all disposed in a same plane.

18. The vehicle system of claim 17, wherein the display includes a projector adapted to project images onto a windshield of the vehicle, and wherein the images are representative of infrared radiation and are formed with visible light based on the video signal.

19. The vehicle system of claim 17, wherein the frame is an outer frame, wherein the payload assembly includes an inner frame to which the camera is coupled fixedly, wherein the outer frame extends around the inner frame, and wherein each vibration isolator is disposed between the inner frame and the outer frame.

20. The method of claim 1, wherein the compression axes defined by the plurality of vibration isolators are all parallel to one another.

* * * * *